United States Patent [19]

Huibers et al.

[11] Patent Number: 5,164,480

[45] Date of Patent: Nov. 17, 1992

[54] METHOD FOR THE MANUFACTURE OF TALL OILS

[75] Inventors: Derk T. A. Huibers, Pennington, N.J.; Roger W. Daniels, Savannah, Ga.; Marilyn J. Niksa, Concord, Ohio; Richard J. Coin, Mentor; Joseph Elliott, Painesville, both of Ohio

[73] Assignee: Union Camp Corporation, Wayne, N.J.

[21] Appl. No.: 747,547

[22] Filed: Aug. 20, 1991

[51] Int. Cl.$^5$ ............................................. B01D 17/06
[52] U.S. Cl. ...................................... 530/230; 204/186
[58] Field of Search ......................... 530/230; 204/186

[56] References Cited

U.S. PATENT DOCUMENTS

| | | | |
|---|---|---|---|
| 942,207 | 12/1909 | Kitsee | 204/131 |
| 2,905,604 | 9/1959 | Kennedy et al. | 204/131 |
| 4,238,304 | 12/1980 | Zucker | 204/186 |

*Primary Examiner*—John Kight, III
*Assistant Examiner*—Richard Lee Jones
*Attorney, Agent, or Firm*—William K. Wissing

[57] ABSTRACT

The present invention relates to the direct electrolysis of tall oil soap (TOS) to produce crude tall oil (CTO). An aqueous tall oil soap solution generated in a kraft wood-pulping process is placed in contact with an anode in an electrolytic cell, wherein the tall oil soap is disassociated to form crude tall oil and free sodium ions. The sodium ions migrate through a membrane to associate with hydroxide ions formed in a cathode chamber to form NaOH, which may optionally be recycled to the kraft pulping process as a make-up chemical for lost sodium. The crude tall oil is recovered from the electrolyzed tall oil soap solution for further refinement. Optionally, the tall oil soap solution is treated prior to electrolysis to remove components which may interfere with the electrolysis.

23 Claims, 3 Drawing Sheets

METHOD FOR THE MANUFACTURE OF TALL OILS

FIELD OF THE INVENTION

The present invention relates to the direct conversion of tall oil soap to tall oil.

BACKGROUND OF THE INVENTION

Coniferous woods, especially pine, contain among other components, lignin, resin acids and long-chain fatty acids. Crude tall oil, a mixture of the resin and fatty acids, is produced as a chemical by-product of the kraft pulping process.

In the kraft pulping process, wood chips are fed into a digester and a "white" cooking liquor containing sodium hydroxide (NaOH) and sodium sulfide ($Na_2S$) is added. The contents are then heated according to a predetermined schedule to complete the cooking reactions, wherein the resin acids and fatty acids are released from the wood chips and saponified. The resulting cooked pulp is separated from the residual cooking liquor, known as black liquor, in a brown stock washing process. The sodium salts of the resin acids and fatty acids, commonly referred to as tall oil soap or "black liquor soap", are suspended in the black liquor. The wood pulp is treated further in the papermaking process to produce papers of various grades.

The recovery of chemicals from the black liquor, the reconstitution of those chemicals to form fresh cooking liquors, the realization of energy from incineration of organic residuals, and minimization of air and water pollution, are all vital parts of the kraft process. Among those chemicals which are recovered from the black liquor is tall oil soap. The soap is contained in the "weak" black liquor (i.e. unconcentrated) which is recovered in the pulping process as a filtrate from the pulp separation.

The initial weak black liquor (at about 15% solids) is filtered to remove fiber and is passed into a weak liquor skimmer. Thirty per cent (30%) to 70% of the available black liquor soap is skimmed off. The black liquor then passes through several stages of evaporative concentration to raise the solids content to 25-30%. The black liquor then passes through a second skimmer from which the remaining 30-70% of soap is skimmed off. The black liquor finally passes through more stages of evaporative concentration to raise the solids to 50-60%. It is then fed to a recovery furnace to be burned. Burning the organic content of the black liquor provides energy for the paper making process and reconstitutes the inorganic chemicals for reuse in fresh pulping liquors. Foran, C. D., "Black Liquor Soap Recovery Methods Employed by Union Camp," *Naval Stores Review*, 94, 14 (1984) (Incorporated by reference herein in its entirety).

One skilled in the art of making kraft paper will recognize that there are various techniques for recovering tall oil soap from the kraft black liquor. Frequently, black liquor soap is degassed (or concentrated) to remove foam and is then settled to decant out excess residual black liquor.

The separated tall oil soap is then normally acidulated with sulfuric acid to form crude tall oil, which can be refined by vacuum fractionation to form tall oil fatty acids and tall oil rosin. The fatty acids and rosin are used in numerous industrial applications, including the preparation of polyamides, rosin resins, adhesive and epoxy compositions. Heretofore the acidulation process comprised the addition of sulfuric acid ($H_2SO_4$) to the tall oil soap to produce crude tall oil and $Na_2SO_4$ salt cake solution. One skilled in the art will recognize that there are various acidulation processes utilizing $H_2SO_4$ for the conversion of tall oil soap to crude tall oil. For a more thorough discussion with references, see McSweeney, E. E.; "*Sulfate Naval Stores*", Naval Stores 171, (1989). The $Na_2SO_4$ as described above is recycled to the kraft pulping process to make up for sodium and sulfur losses.

The economics of the production of crude tall oil from tall oil soap depends to a considerable degree on the ability to dispose of the spent acid from the acidulation process. Heretofore, the producers of crude tall oil would sell the by-product $Na_2SO_4$, hereinafter referred to as salt cake, to the paper mills as make-up chemicals in the kraft pulping process. A typical kraft mill in the early '70s was designed for cost effective chemical recovery with little regard for the environment. Sodium recovery was around 93% while sulfur recovery was only about 61%. Twiss, A. H., *Naval Stores Review*, 94 (2), 14 (1984) (Incorporated by reference herein in its entirety.) With the introduction of more stringent environmental controls on the emission of air and water pollutants, a state of the art greenfield mill (1984) being designed to meet the more stringent new source performance standards was predicted to achieve over 97% sodium recovery and 91% sulfur recovery. Twiss reports that as of 1984, total sodium loss expressed as equivalent salt cake had been decreased from 135 to 70 pounds/ton of pulp for a mill meeting then existing source standards, down to 53 pounds for a new state of the art (1984) mill. Total sulfur losses were decreased from 175, to 75, to 40 pounds of equivalent salt cake per ton of pulp, due mainly to reduced emissions from the recovery boiler and lime kiln. These reduced losses have had a drastic impact on the make-up Sodium and sulfur requirements in the kraft pulping process, which must balance the losses. The result is that the paper mills no longer desire or require the previous levels of salt cake produced in the sulfuric acid acidulation of tall oil soap to make-up for losses of sodium and sulfur. In fact, a large amount of the salt cake make-up has been replaced with more costly caustic soda to lower the sulfur make-up. Without the paper mills to use the salt cake produced by the acidulation of tall oil soap, it would appear that the salt cake must be sewered. Organic contaminants contained in the sewer discharge which contains the salt cake increases the biochemical oxygen demand (BOD) levels in the water streams receiving the discharge. Therefore, the limitations on sewering of the salt cake will increase due to even more stringent environmental restrictions.

Wong, also discussed tall oil soap acidulation and sulfur balance problems in kraft mills. Wong, A., *Naval Stores Review*, 94, (3), 8 (1984) (Incorporated by reference herein in its entirety.) Wong reported the same problems associated with the salt cake from the acidulation of the tall oil soap as did Twiss. Wong proposed the replacement of $H_2SO_4$ used in soap acidulation with chlorine dioxide generator effluent to lower the sulfur input into the mill liquor system. However, the reduced sulfur input would still be higher than the losses in the mill by about 10%.

It has been suggested that the tall oil acidulation process can be modified to reduce or eliminate by-product sulfur by the use of other common acids, such as hydrochloric. The use of such acids, however, would prohibit recovery of the spent acid due to build-up of extraneous anions and problems in tall oil purification. Electrolysis of spent acid to NaOH and a mixture of $H_2SO_4$ and $Na_2SO_4$ has also been investigated. Replacement of about one-half of the $H_2SO_4$ with carbon dioxide has also been patented by Bills, A. M., U.S. Pat. No. 3,901,869 (1975) (Twiss, at p. 16).

These proposed solutions only partially address the problem. Very simply, too much sulfur as $Na_2SO_4$ is produced in the soap acidulation plants to be recycled to the paper mill liquor system for satisfactory sulfidity and sulfur emissions control.

Another problem associated with the reduced requirement for $Na_2SO_4$ salt cake as a make-up chemical in the kraft pulping process is that caustic soda must be used to replace sodium lost in the kraft pulping process. Not only is the caustic soda more expensive than the $H_2SO_4$ acidulation salt cake by-product, but the production of NaOH from sodium chloride yields chlorine. If the pulp manufacturer elects to buy only the NaOH and not the chlorine, a premium price is paid for the NaOH since the producer of the NaOH and chlorine must then sell or dispose of the chlorine himself. In essence, the papermaker is paying both for the caustic soda and the chlorine, even though he does not use the chlorine.

There is a long felt need in the papermaking industry for a process to acidulate tall oil soap to form crude tall oil without the formation of $Na_2SO_4$ salt cake. There is also a need to economically produce caustic soda to be recycled to the pulping process without the production of chlorine. These needs have not been satisfied to date, even in the face of more stringent environmental emission controls and reduced requirements for salt cake in the paper mills.

Therefore it is an object of the present invention to provide a process for the acidulation of tall oil soap to form crude tall oil without the formation of $Na_2SO_4$ salt cake. It is another object of the present invention to provide a process for the economical production of caustic soda to be recycled to the kraft pulping process without the production of chlorine.

SUMMARY OF THE INVENTION

It has been discovered in accordance with the present invention that crude tall oil can be prepared by the direct electrolysis of tall oil soap. A dilute aqueous tall oil soap solution is placed in contact with an anode positioned within an anode chamber. The anode chamber is separated by a membrane which is chemically inert to the tall oil soap solution, permeable to sodium ions and impermeable to hydroxide ions, from a cathode chamber containing an aqueous electrolyte solution and having a cathode positioned therein. A current having a current density which is effective to electrolyze the water in both the anode and cathode chambers is applied to the anode and cathode. The electrolysis of the water in the anode chamber liberates protons which react with the tall oil soap to form crude tall oil and free sodium ions, which sodium ions migrate through the membrane to the cathode chamber. The sodium ions and the hydroxide ions formed by the electrolysis of the water in the cathode chamber then form a NaOH solution. The current is applied to the electrode for a time sufficient to substantially convert the tall oil soap to the crude tall oil. The crude tall oil is separated then from the anolyte, which anolyte comprises crude tall oil, water, sodium salts and lignin.

Optionally, the tall oil soap solution may be pretreated prior to electrolysis to remove ions, such as calcium, and solids, such as sodium lignate, which may reduce the efficiency of the electrolysis. Also optionally, the NaOH may be recycled to the kraft pulping process as a chemical make-up for the loss of soda therein.

DETAILED DESCRIPTION OF THE INVENTION

Coniferous wood, particularly pine, contains resin acids in the free acid form, long-chain fatty acids primarily in the form of glycerides, and lignin. Resin acids are monocarboxylic diterpene acids commonly having the molecular formula $C_{20}H_{30}O_2$. Among those resin acids present are abietic, levopimaric, neoabietic, palustric, dehydroabietic, isopimaric, sandaracopimaric, pimaric, and secodehydroabietic acid. The fatty acids found in the coniferous woods are typically $C_{16}$-$C_{18}$ saturated or unsaturated fatty acids, including palmitic, stearic, palmitoleic, oleic and linoleic. Lignin is a phenylpropane polymer of amorphous structure which acts more or less as a plastic binder for the holocellulose fibers.

Figure 1:
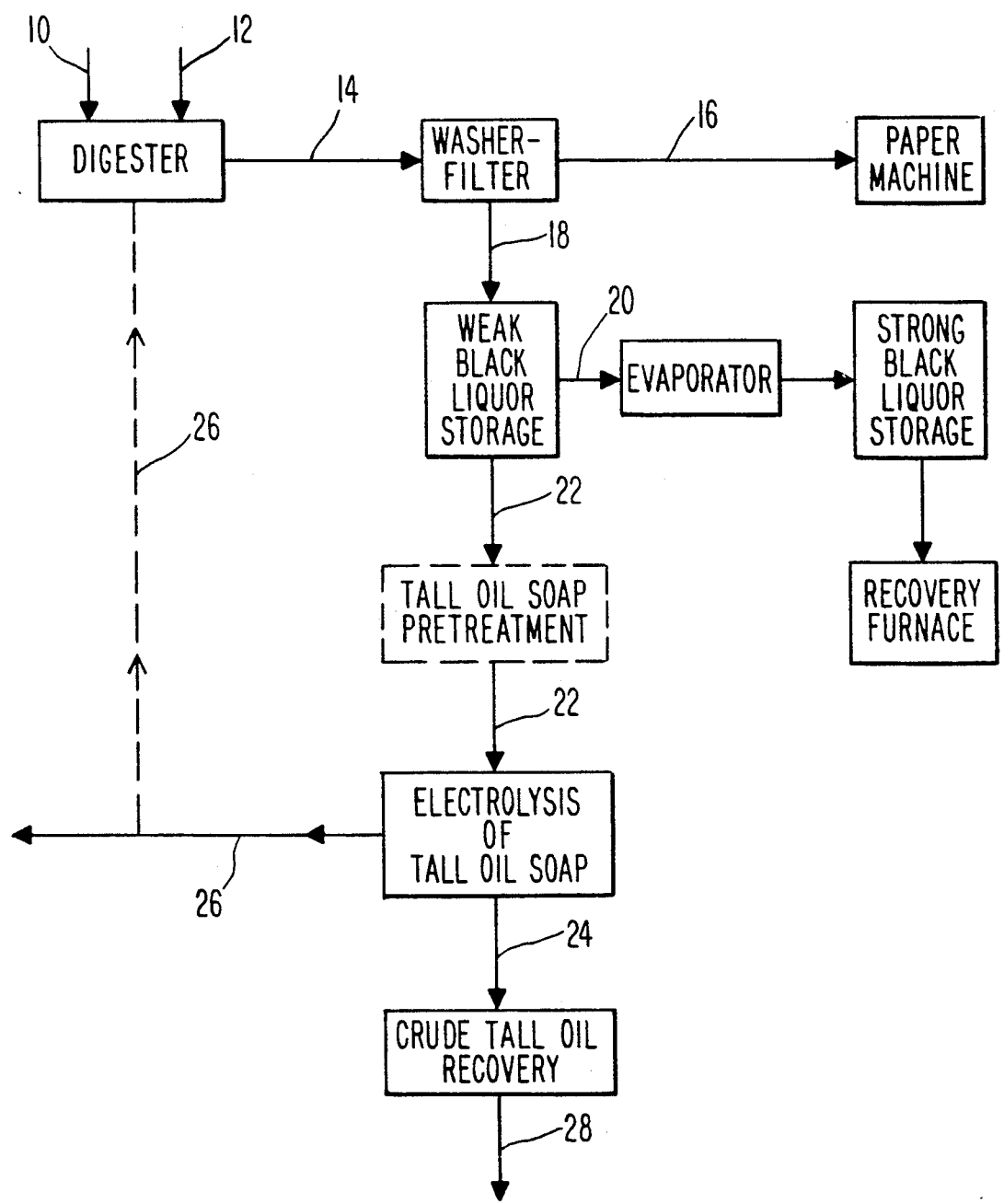
FIG. 1 is a schematic flow diagram of kraft pulping and crude tall oil recovery systems utilizing the present invention.

Referring to FIG. 1, in a kraft pulping process, wood chips 10 containing the resin acids, long-chain fatty acids, and lignin, and cooking liquor 12 comprising NaOH and $Na_2S$ are added to a digester and heated according to a predetermined schedule of temperature and time to dissolve a significant portion of the lignin in the cooking liquor. During the cooking process, the fatty acid glycerides and the resin acids are saponified by the alkaline cooking liquor, thereby forming sodium salts of those acids. The resulting salts, commonly referred to as "black liquor soap" or "tall oil soap", are dissolved in the cooking liquor along with sodium lignate.

The cooked pulp and cooking liquor (collectively 14) are passed to a brown stock filter/washer, where the cooked pulp 16 is separated from the residual cooking liquor 18 and carried forward to the papermaking machine for processing into various grades of paper. The residual cooking liquor 18, known as "black liquor", which contains dissolved tall oil soap and lignin, is placed in a weak black liquor storage facility wherein the tall oil soap is separated from the black liquor by methods discussed previously herein. The spent black liquor 20 is concentrated in a series of evaporators and placed in a strong black liquor storage facility. The strong black liquor is forwarded to the recovery furnace wherein the organic portion is burned to produce heat to raise steam, and the inorganic chemicals are reconstituted to form fresh pulp cooking liquors.

According to the process of the present invention, the tall oil soap 22 is acidulated in an electrolytic cell to form a stream 24 of a dispersion of crude tall oil and lignin in aqueous sodium salt solution, and an aqueous NaOH solution 26. Optionally, the NaOH 26 may be recycled to the kraft pulping process as a make-up chemical for lost sodium. The crude tall oil 28 is separated then from the solution 24 by methods discussed herein.

The tall oil soap solution derived from the kraft pulping process is a high viscosity, gelatinous material which contains occluded black liquor with dissolved sodium lignate, and some calcium ions. It is believed that the presence of the calcium ions may reduce the sodium ion permeability of the membrane contained within the electrolytic cell upon extended use in the process of the present invention, while the presence of the sodium lignate may lead to membrane fouling. Therefore, the tall oil soap optionally may be pretreated prior to the electrolysis of the soap to remove those calcium ions and sodium lignate, thus improving the efficiency of the electrolysis procedure.

Prior to electrolysis, the viscosity of the aqueous tall oil soap solution must be sufficiently low to allow circulation of the tall oil soap solution through the electrolytic cell. One method of reducing the viscosity to a sufficiently low value is to dilute the tall oil soap with additional water. However, the inclusion of additional water in the tall oil soap solution requires handling of additional volumes of material in subsequent steps of the process and preferably is minimized. More preferably, the temperature of the tall oil soap solution is adjusted to achieve the sufficiently low viscosity required to circulate the tall oil soap solution through the electrolytic cell. Preferably the temperature of the aqueous tall oil soap solution is less than 100° C., and more preferably between about 50° C. and 80° C.

Figure 2:
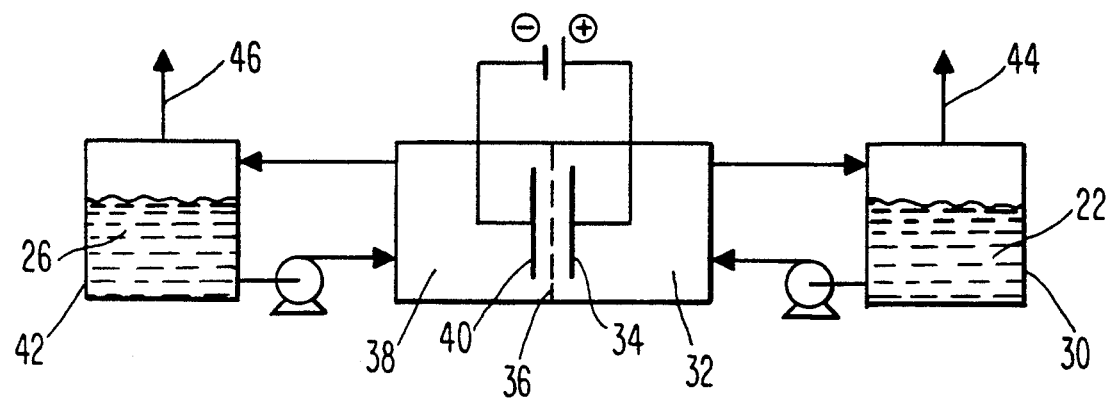
FIG. 2 is a diagrammatic representation of a batch process embodiment of the present invention.

The electrolysis of the tall oil soap to crude tall oil may be carried out either in a batch process or a continuous process. Referring to FIG. 2, a diagram of a batch process embodiment of the present invention is presented. The aqueous tall oil soap solution 22 having a pH of 10-12 is placed in an appropriate first holding vessel 30. The tall oil soap solution is circulated through an anode chamber 32 and contacted with an anode 34 positioned therein. The anode chamber 32 is separated by a membrane 36 from a cathode chamber 38 having a cathode 40 positioned therein. The membrane 36 must be chemically inert with respect to the tall oil soap, and it must be permeable to free sodium ions, yet impermeable to hydroxide ions. One example of an appropriate membrane is a Nafion membrane (E.I. DuPont DeNemours & Co., Inc.).

An aqueous sodium hydroxide solution 26 contained in a second holding vessel 42 and having a concentration ranging from about 0.1-5M, more preferably from about 0.52-2.5M, is circulated through the cathode chamber 38 and contacted with the cathode 40. The current is applied to the anode and cathode for a time sufficient to substantially convert the tall oil soap to crude tall oil. The conversion of the tall oil soap to crude tall oil may be monitored by the pH of the anolyte. The electrolysis of the tall oil soap may be terminated when the pH of the anolyte is reduced to less than about 4, and more preferably about 3. Sodium ions migrating through the membrane form additional aqueous NaOH in the cathode compartment 38 and accumulate in tank 42. Molecular oxygen 44 and hydrogen 46 gasses are produced as by-products of the electrolysis at the anode and cathode, respectively.

Figure 3:
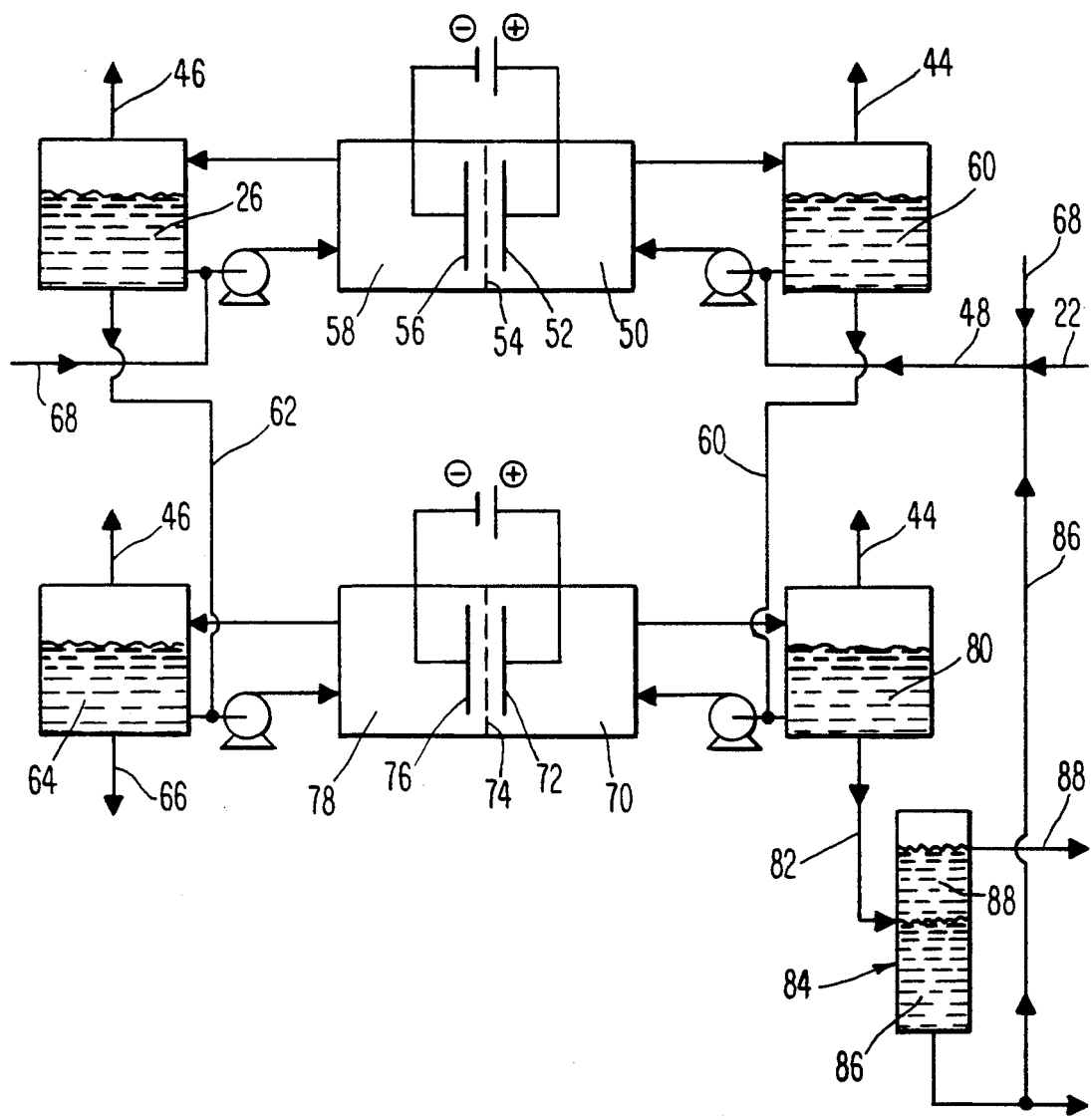
FIG. 3 is a diagrammatic representation of a continuous process embodiment of the present invention.

Referring to FIG. 3, a diagram of a multi-stage, continuous process embodiment of the present invention is shown. The tall oil soap 22 is added to a tall oil soap feed mixture 48 and circulated through a first anode chamber 50 having a first anode 52 positioned therein. The first anode chamber 50 is separated by a first membrane 54 from a first cathode chamber 58 having a first cathode 56 positioned therein. An aqueous NaOH solution 26 having a concentration of from about 0.1-5M is circulated through the first cathode chamber 58 and contacted with the first cathode 56. Upon partial electrolysis of the tall oil soap solution, a first anolyte 60 comprising protons, free sodium ions, tall oil soap, and crude tall oil, and a first catholyte 62 comprising NaOH (0.1-5M), preferably of greater concentration than the NaOH solution 26, are produced. The partially electrolyzed anolyte 60 is circulated through a second anode chamber 70 having a second anode 72 positioned therein. The second anode chamber 70 is separated by a second membrane 74 from a second cathode chamber 78 having a second cathode 76 positioned therein. The first catholyte 62 is circulated through the second cathode chamber 78 and contacted with the second cathode 76, thereby producing a second catholyte 64 having a NaOH concentration between about 0.1-5M and preferably greater than the first catholyte 62. Again, $O_2$ 44 and $H_2$ 46 gasses are produced by the electrolysis.

The second anolyte 80 may be electrolyzed to the extent that the conversion of the tall oil soap to the crude tall oil is substantially complete, in which case the fully electrolyzed anolyte 82 would be transported to the crude tall oil recovery system, such as a decanter 84 as shown. In the decanter 84, the fully electrolyzed anolyte 82 is allowed to separate into a lower aqueous phase 86 containing sodium salts such as sodium sulfate, and an upper phase 88 consisting essentially of crude tall oil. The crude tall oil 88 is removed for further processing to produce tall oil fatty acids and tall oil rosins. The aqueous phase 86 optionally may be recycled and combined with the tall oil soap 22 in addition to make-up water 68 to form the tall oil soap feed mixture 48. If the anolyte 80 were further electrolyzed, but not completely electrolyzed, the partially electrolyzed second anolyte 80 would be transported to a third anode chamber (not shown) and further electrolyzed as described above. Optionally, caustic soda 66 recovered as NaOH may be recycled to the kraft pulping process as a make-up chemical.

It will be recognized by one of ordinary skill in the art that the number and design of the electrolytic cells will be determined by various factors, and the embodiments previously discussed is by no means intended to limit the scope and spirit of the present invention.

A current having a current density sufficiently high to electrolyze the water in both the anode and cathode chambers is applied to the anode and cathode. One of ordinary skill in the art will recognize that the proper current density is determined by a number of factors including the surface area of the electrodes, electrode spacing, design of the electrode chambers, resistance of the electrolytes, and the like. As used herein, current density represents the current (kA) divided by the electrode surface area ($m^2$).

Power consumption per unit of NaOH in an electrolytic process is directly proportional to the cell potential and inversely proportional to the current efficiency. In this process, the primary electrolytic reaction is the splitting of water to $H_2$ and $O_2$, which is well understood and highly efficient. The assumption of 99% current efficiency is consistent with the present state of the art of the membrane. The process operating potential is more variable and is highly dependent upon cell and process design. The minimization of the cell potential, while still maintaining adequate electrolysis to acidify the tall oil soap is desired. The cell potential, also referred to as cell voltage, is influenced by a number of factors, and is normally treated as the sum of reaction EMF or thermodynamic equilibrium potential, electrode polarization and ohmic polarization or resistivity.

The thermodynamic equilibrium voltage is a function of the reactant and product concentrations. The only factors which could change significantly over the course of the electrolysis are the concentrations of protons in the anolyte and the hydroxide ions in the catholyte. As these reaction products build up, the cell EMF gradually rises. Product and reactant concentrations can vary by several orders of magnitude before they significantly change the equilibrium potential, and therefore are not a major factor in the cell potential.

Electrode polarization arises at high current densities where the rate of reaction is greater than the rate of species transport to or from the electrode surface. For example, hydroxide ions are formed at the cathode surface. These ions then diffuse through a laminar boundary layer into the bulk of the catholyte. If the rate of hydroxide production is rapid, the ionic concentration at the electrode surface increases, causing an increase in the potential needed to effect a reduction. Electropolarization can be minimized by slowing the rate of reaction (i.e., operating at low current density), or by enhancing the rate of mass transport with good cell design, agitation or electrolyte circulation.

Ohmic polarization is the voltage required to pass current through the resistive electrolyte solution. The ohmic potential is minimized by the use of low current densities, close electrode spacing and high specific conductivities.

Higher current densities reduce capital cost by reducing electrode size, but increase power consumption by raising the voltage drop due to electrode and ohmic polarization. Therefore it is preferable to optimally minimize the current density to avoid these potential problems. Cell potential is also a function of the conductivity of the electrolyte. If ohmic polarization is determined to make up a significant fraction of the cell potential, co-electrolytes which will increase conductivity without affecting current efficiency may be used. Preferably, the tall oil soap to be electrolyzed will contain from about 0.1-1.5M $Na_2SO_4$.

The current density of the present invention ranges from about 0.5 to about 5 $kA/m^2$, more preferably from about 1 to 3 $kA/m^2$. The cell potential utilized in the present invention is from about 2 to 12 volts, more preferably from about 2 to 8 volts. Most preferably the cell potential of the present invention ranges from about 5 to 7 volts.

Upon direct electrolysis of the tall oil soap, water is oxidized at the anode to form protons and molecular oxygen. The released protons react directly with the soap ($RCOO^-Na^+$) to form fatty and resin acids:

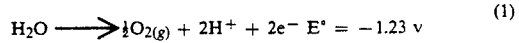
(1)

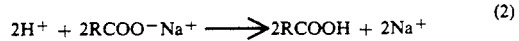
(2)

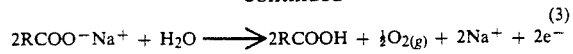
(3)

The free sodium ions generated in the anode chamber then migrate through the membrane to the cathode chamber. At the cathode, water is split and the protons are reduced to hydrogen gas, releasing free hydroxide ions:

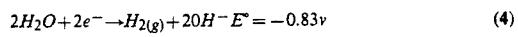
(4)

Charge neutrality is maintained by the flow of electrons through the external electrical circuit and by migration of the sodium ions from the anolyte to the catholyte across the membrane. The net reaction is a two electron process:

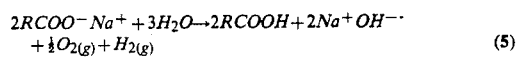
(5)

After the acidulation of the tall oil soap is complete, the crude tall oil must be recovered from the electrolyzed anolyte for further processing. Among techniques which may be used are distillation, sedimentation followed by decantation, or centrifugation. If dilution of the tall oil soap with water beyond 1:1 is necessary, the recovery of the crude tall oil will require handling larger volumes of residual liquid. Therefore, it is preferable that the dilution of the tall oil soap with additional water prior to the electrolysis be minimized.

Direct electrolysis of tall oil soap to crude tall oil has one significant advantage over the $H_2SO_4$ acidulation process in that sodium is recovered as NaOH. The NaOH has high value in the paper mills as a chemical make-up in the kraft pulping process. Therefore, the most preferred embodiment of the present invention recycles the NaOH from the electrolysis process to the kraft pulping process. The use of a Nafion membrane permits sufficient water to pass from the anode compartment into the cathode compartment such that aqueous caustic soda at 12-20% NaOH accumulates. This is sufficiently concentrated that it may usefully be recirculated for use in the pulp mill without the need for further evaporative concentration stages.

The present invention then satisfies a long felt need in the papermaking industry in that it surprisingly provides a method for the production of crude tall oil from tall oil soap without the production of $Na_2SO_4$ salt cake, the disposal of which cake is becoming more and more of a serious problem in the papermaking industry. The invention eliminates both the problems of the crude tall oil producers losing the credit value for the cake, which heretofore has been returned to the pulp mill, and disposal of the cake once the pulp mill no longer will accept the cake. Additionally, the present invention provides an economically and environmentally sound process for the production of valuable NaOH for use as a make-up chemical in the kraft pulping process, without the problems associated with the prior art methods which generate chlorine.

EXAMPLE 1

An electrolytic cell having an electrode area of about 50 $cm^2$ was constructed according to FIG. 2. About 400 grams of the tall oil soap were added to the holding vessel and diluted to about 2 liters with water containing about 75 grams of $Na_2SO_4$. The aqueous tall oil soap solution was circulated at a rate of 1 liter per minute through the anode chamber and a current of 10 amps (current density=2 kA/m$^2$) was applied to the electrodes for roughly two hours, followed by 20 amps (current density=4 kA/m$^2$) for 0.5 hours. The electrolysis was terminated when the pH of the anolyte dropped from about 10 to about 3, while the cell potential dropped from about 12 to about 5 volts as the conductivity of the solutions increased. The resulting crude tall oil was decanted from the anolyte after gravity separation. The crude tall oil was analyzed and found to have a soap number of zero, indicating that the conversion of the tall oil soap to the crude tall oil was substantially completed.

EXAMPLE 2

Utilizing the electrolytic cell of Example 1, about 400 grams of the tall oil soap were added to the holding vessel. About 1600 grams of water containing about 75 grams of Na$_2$SO$_4$ were added to the holding vessel. The aqueous tall oil soap solution was circulated at a rate of one liter per minute through the anode chamber and a current of 10 amps (current density=2 kA/m$^2$) was applied to the electrodes for roughly 2 hours and 20 minutes. About 300 grams of a 0.5M aqueous sodium hydroxide solution (NaOH) was added to a second holding vessel and circulated through a cathode chamber and contacted with the cathode positioned therein for the same 2 hour and 20 minute period. The initial cell potential of 15 volts increased after approximately 35 minutes to about 20 volts and subsequently decreased at the end of 1 hour to about 7 volts, at which point it remained essentially constant throughout the remaining 1 hour and 20 minutes. The electrolysis was terminated when the pH of the anolyte dropped from about 10 to about 3. The resulting crude tall oil was decanted from the anolyte after gravity separation. The crude tall oil was analyzed and found to have a soap number of 0, indicating that the conversion of the tall oil soap to the crude tall oil was substantially completed. Upon completion of the electrolysis, the cathode chamber contained approximately 360 grams of a 2.5M sodium hydroxide solution, indicating a recovery of about 0.7M of sodium hydroxide or about 17 grams of sodium.

Those skilled in the art will appreciate that numerous changes and modifications may be made to the preferred embodiments of the invention and that such changes and modifications may be made without departing from the spirit of the invention. It is therefore intended that the appended claims cover all such equivalent variations as fall within the true spirit and scope of the invention.

What is claimed:

1. A process for preparing crude tall oil from tall oil soap, comprising:
   directly electrolyzing an aqueous tall oil soap solution under conditions of temperature, current density and time effective to form a dispersion of crude tall oil in an aqueous salt solution, and a caustic solution; and
   recovering said crude tall oil from said dispersion.

2. The process of claim 1 wherein said recovery of said crude tall oil from said dispersion comprises techniques selected from the group consisting of sedimentation, centrifugation and decantation.

3. The process of claim 1 further comprising recycling said caustic solution to a Kraft pulping process.

4. The process of claim 1 wherein said temperature is less than 100° C., said current density is from about 0.5–5 kA/m$^2$ and said time is sufficient to substantially convert said tall oil soap to said crude tall oil.

5. The process of claim 4 wherein said temperature is between about 50°–80° C.

6. The process of claim 4 wherein the conversion of said tall oil soap to said crude tall oil is substantially complete when the pH of said electrolyzed aqueous tall oil solution is reduced to less than about 4.

7. A process for preparing crude tall oil from tall oil soap, comprising:
   directly electrolyzing an aqueous tall oil soap solution, at a temperature of less than about 100° C., at a current density of from about 0.5–5 kA/m$^2$, for a time sufficient to lower the pH of said electrolyzed aqueous tall oil soap solution to less than about 4, to form a dispersion of crude tall oil in an aqueous salt solution, and a caustic solution; and
   recovering said crude tall oil from said dispersion utilizing techniques selected from the group consisting of sedimentation, centrifugation and decantation.

8. The process of claim 7 wherein said temperature is from about 50°–80° C. and said current density is from about 1–3 kA/m$^2$.

9. The process of claim 7 further comprising recycling said caustic solution to a Kraft pulping process.

10. A process for the preparation of crude tall oil from tall oil soap, comprising:
    placing an aqueous tall oil soap solution in contact with an anode positioned within an anode chamber, said anode chamber being separated by a membrane from a cathode chamber containing an aqueous electrolyte solution and having a cathode positioned therein,
    applying a current having a current density effective to electrolyze the water in said anode chamber and said cathode chamber to said anode and cathode, said current being applied for a time sufficient to substantially convert said tall oil soap to crude tall oil; and
    recovering said crude tall oil from the electrolyzed tall oil soap solution,
    wherein the electrolysis of said water in said anode chamber causes the formation of said crude tall oil, protons and free sodium ions, which sodium ions migrate through said membrane to said cathode chamber, and wherein the electrolysis of said water in said cathode chamber causes the formation of hydroxide ions which in combination with said sodium ions constitute sodium hydroxide.

11. The process of claim 10 wherein said current density is from about 0.5–5 kA/m$^2$.

12. The process of claim 10 wherein said membrane is chemically inert to said tall oil soap solution, permeable to said free sodium ions and impermeable to said hydroxide ions.

13. The process of claim 10 wherein the conversion of said tall oil soap to said crude tall oil is substantially complete when the pH of said electrolyzed aqueous tall oil solution in said anode chamber is reduced to less than about 4.

14. The process of claim 10 wherein said recovery of said crude tall oil comprises techniques selected from the group consisting of sedimentation, centrifugation and decantation.

15. The process of claim 10 further comprising recycling said sodium hydroxide to a kraft pulping process.

16. The process of claim 10, further comprising placing said tall oil soap solution in contact with a plurality of anodes.

17. The process of claim 10 wherein the viscosity of said aqueous tall oil soap solution is sufficiently low to allow circulation through said anode chamber.

18. The process of claim 17 wherein the temperature of said aqueous tall oil soap solution is less than 100° C.

19. The process of claim 18 wherein the temperature of said soap solution is between about 50° C. and 80° C.

20. The process of claim 10 further comprising pretreating said aqueous tall oil soap solution prior to said contact with said anode to remove calcium ions and sodium lignate.

21. The process of claim 20 wherein said pretreatment comprises precipitation, filtration, or precipitation and filtration.

22. The process of claim 21 further comprising recycling said sodium hydroxide to a kraft pulping process.

23. A process for the preparation of crude tall oil from tall oil soap, comprising:

removing calcium ions and sodium lignate from an aqueous tall oil soap solution which is a by-product of a kraft pulping process, circulating said tall oil soap solution through an anode chamber having an anode positioned therein, said anode chamber being separated by a membrane from a cathode chamber containing an aqueous sodium hydroxide solution and having a cathode positioned therein, said membrane being chemically inert to said tall oil soap solution, permeable to sodium ions and impermeable to hydroxide ions, applying a current having a current density from about 2-4 kA/m$^2$ to said anode and cathode until the pH of said electrolyzed tall oil soap solution is reduced to about 3, wherein the electrolysis of said water in said anode and cathode chambers causes the formation of an anolyte in said anode chamber comprising crude tall oil, protons and free sodium ions and a catholyte in said cathode chamber comprising hydroxide ions, which sodium ions migrate through said membrane to said cathode chamber and combine with said hydroxide ions to form sodium hydroxide, recovering said crude tall oil from said anolyte; and recycling said sodium hydroxide to said kraft pulping process.

* * * * *